United States Patent
Charter

(10) Patent No.: US 12,370,525 B1
(45) Date of Patent: Jul. 29, 2025

(54) ALMOND HULL AND/OR SHELL ABSORBENT AND METHOD OF USE

(71) Applicant: Halbert W. Charter, Arbuckle, CA (US)

(72) Inventor: Halbert W. Charter, Arbuckle, CA (US)

(*) Notice: Subject to any disclaimer, the term of this patent is extended or adjusted under 35 U.S.C. 154(b) by 56 days.

(21) Appl. No.: 18/532,126

(22) Filed: Dec. 7, 2023

Related U.S. Application Data

(60) Provisional application No. 63/431,861, filed on Dec. 12, 2022.

(51) Int. Cl.
| | |
|---|---|
| *B01J 20/24* | (2006.01) |
| *B01J 20/28* | (2006.01) |
| *B01J 20/30* | (2006.01) |
| *B08B 7/00* | (2006.01) |
| *C09K 3/32* | (2006.01) |

(52) U.S. Cl.
CPC ......... *B01J 20/24* (2013.01); *B01J 20/28004* (2013.01); *B01J 20/28016* (2013.01); *B01J 20/3021* (2013.01); *B08B 7/00* (2013.01); *C09K 3/32* (2013.01)

(58) Field of Classification Search
CPC .......... B01J 20/24; B01J 20/28004; B01J 20/28016; B01J 20/3021; B08B 7/00; C09K 3/32
See application file for complete search history.

(56) References Cited

U.S. PATENT DOCUMENTS 5,861,362 A    1/1999   Mayeux et al.

FOREIGN PATENT DOCUMENTS

WO    WO-2011140306 A1 *  11/2011  ......... B01D 17/0202

* cited by examiner

*Primary Examiner* — Sharidan Carrillo
(74) *Attorney, Agent, or Firm* — Heisler & Associates

(57) ABSTRACT

An absorbent meal is provided which is formed of ground up almond hull and almond shell. The almond hull and almond shell can be residue of an almond fruit extraction process. A spontaneous combustion inhibitor is optionally added to the absorption meal. Particle size for the absorption meal is less than about 5 mm. In one embodiment, the absorbent meal is greater than about 15% almond shell before any spontaneous combustion inhibitor is added.

3 Claims, 2 Drawing Sheets

ALMOND HULL AND/OR SHELL ABSORBENT AND METHOD OF USE

CROSS-REFERENCE TO RELATED APPLICATIONS

This application claims benefit under Title 35, United States Code § 119(e) of U.S. Provisional Application No. 63/431,861 filed on Dec. 12, 2022.

FIELD OF THE INVENTION

The following invention relates to absorbent media for use in absorbing spilled liquids. More particularly, this invention relates to absorbent media/meal made of almond hull and shell as well as methods for manufacture and methods for use of such absorbent.

BACKGROUND OF THE INVENTION

When almonds grow on the tree, such almond fruit has three main layers including an outer hull which is generally a semi-soft somewhat leathery jacket, a shell inboard of the hull and the meat contained within the shell. Processing of almond fruit generally involves machinery where almond hulls and shell are separated from the meat (the edible kernel). Depending on market conditions, it may be decided to remove the hull only and deliver the nuts to the buyer "in-shell."

While some farmers own their own huller/sheller to extract the meat, most farmers transport their almond fruit to a central hulling/shelling facility. Typically such transportation and processing occurs after the almonds have been removed from the tree and have fallen to the ground and dry out at least somewhat.

There is a significant amount of byproduct (or "remnant") that is created from the hulling and shelling machinery to extract the edible meat from the fruit. This byproduct includes the hull and the shell. It is known that the byproduct is utilized as a feed additive to livestock.

In particular, almond hulls and shells being used as a livestock feed additive involves adjusting the hull to shell ratio so that the finished product is less than 15% fiber. This threshold is regulated by the California Department of Food and Agriculture or equivalent other state or federal regulators. Separators are known to separate shell from hull with sufficient effectiveness to reduce the shell content below this 15% threshold, and to allow the finished product to qualify as a livestock feed additive.

While this use for the almond fruit processing "remnant" is generally effective, it would be beneficial if there were other useful products and purposes to which this remnant could be beneficially employed, especially remnant with a fiber content of higher than about 15%. Any such useful products, being naturally produced in a sustainable agricultural process, could beneficially displace other products which might be produced in a less sustainable fashion or have other undesirable attributes or excessive cost.

One known prior art use for at least portions of the almond fruit processing remnant is to separate almond shell from almond hull and grind the shell and then to use the shell with well hole drilling machinery to reduce hole cake thickness and permeability, and enhance hole cake toughness, seal off depleted sands and micro fractures, and generally reduce drag and torque, as described in detail in U.S. Pat. No. 5,861,362. While beneficial, such a use for the almond fruit processing remnants requires separation of shell from hull, and also requires grinding of the shell, after separation from the hull, making this byproduct more expensive and resource intensive than simpler alternative uses for almond fruit processing remnants.

SUMMARY OF THE INVENTION

With this invention, the remnants of almond fruit separation are further separated into an absorbent material which can be used as a "ground sweep," oil and other hazardous waste cleanup material, cat/pet litter box media, and/or other granular absorbent product. The product could be provided as a large volume industrial absorbent, or packaged for consumer and other small scale uses.

According to one embodiment of the invention, the initial remnants of the almond fruit separation, which removes the meat from the almond fruit, consists primarily of almond hull and almond shell, both of which are substantially dry (typically less than 10%, and at most in some cases up to 20% moisture by weight). As a first step, this remnant material is run through a mill to grind up the remnant material into a "meal" in the form of a substantially homogenous mixture of almond hull and almond shell. Typically this mixture has a four to one ratio of almond hull to almond shell. Beneficially in one embodiment, no removal of shell or any separating of the hull from the shell needs to occur, so that this meal can be produced in a more efficient and economical manner than the prior art known use of this remnant material as a livestock feed additive.

The meal resulting from the grinding of the remnant material can be formed using a variety of different grinding equipment. In one embodiment, a laminar mill is utilized. Typically, average particle size after such a grinding step is about 1 mm to about 3 mm in diameter (or longest dimension if not generally spherical). Particle sizes up to about 5 mm are still considered to be effective as an absorbent. A typical ratio for this meal is about a four to one ratio of hull to shell, so that the absorbent meal in this raw state is about 80% hull and 20% shell (by weight).

In alternative embodiments, any meal with greater than 15% shell would be of some beneficial use as an absorbent meal, in that this meal would generally not qualify as a livestock feed additive due to a high percentage of fiber content. In a further alternative embodiment, it is conceivable that absorbent meal with a less than 15% fiber content, and at least somewhat usable as a livestock additive could still be utilized as an absorbent according to this invention.

As a beneficial attribute of this absorbent meal, it is noted that no separation of the hull from the shell needs to occur. Such separators can be complex machines which need to be carefully maintained in an appropriate operational state to effectively separate the hull from the shell. Eliminating the need for such separation, and feeding the hull and shell together into the laminar mill or other grinding apparatus to create the absorbent meal, eliminates a step, thus making the absorbent meal an inexpensive product to produce. As an alternative, a separator can be used to reduce shell content for a first output stream to feed grade (less than 15% fiber by weight) and a second output stream from the separator would have a fiber content of greater than 15% (by weight). The second output stream would then be used as absorbent in this form or after further processing and/or adjustment of constituents.

The resulting absorbent meal could in many instances be utilized in this raw form. When certain low humidity and other environmental conditions exist, and when a sufficiently large amount of raw absorbent meal is accumulated in one place, there is a potential for spontaneous combustion. Such spontaneous combustion can cause damage to equipment, potential for wildfire, potential for injury to personnel, and loss of the raw absorbent meal. Thus, in one embodiment, spontaneous combustion inhibitor is added to the raw absorbent meal to produce a finished absorbent meal.

While any of a variety of different spontaneous combustion inhibitors could be utilized, examples include sodium nitrate, sodium chloride, calcium carbonate, ammonium dihydrogen phosphate, calcium chloride, ammonium chloride, sodium acetate, and potassium chloride (or combinations of the above). Different spontaneous combustion inhibitors can be utilized, and the amount of spontaneous combustion inhibitor to be added to the finished absorbent meal product can be selected based on a variety of factors. Such factors can include expected humidity to be encountered, particle size for the raw absorbent meal after grinding, amounts of absorbent meal to be aggregated together, spontaneous combustion risk tolerance of the consumer who is acquiring the absorbent meal, and the suitability of the spontaneous combustion inhibitor for the situation in which the absorbent is likely to be utilized by an end user.

While end users of the finished absorbent meal could be a variety of different end users, one form of end user is a government or large industrial user who maintains roads and other large pavement surfaces, such as various state departments of transportation, military, and other government agencies. Such agencies are often tasked with fuel (and other hydrocarbon) spill cleanup projects. Goals of such cleanup projects can include keeping the fuels out of natural waterways, wetlands, and other natural environments adjacent to paved areas where spills have occurred. Other goals include minimization of release of volatile fuels into the atmosphere as air polluting vapors. Other liquid or solid spills from vehicles can also be beneficially treated. When fuel (or other material) clean up in a paved (or unpaved) roadway is involved, the local jurisdiction's tolerance for having various different salts utilized on such roadways can be a guide in determining which spontaneous combustion inhibitor(s) to utilize and in which quantities. Furthermore, spontaneous combustion inhibitors can have an influence on the effectiveness of the absorbent meal in performing its absorbent function. Thus, generally spontaneous combustion inhibitors are selected to preserve (or even enhance) the absorbent characteristics of the finished absorbent meal and its suitability for use on a roadway or in other uses.

In one embodiment, the amount of additive in the form of spontaneous combustion inhibitor that is added to the raw absorbent meal results in the finished absorbent meal being 15% spontaneous combustion inhibitor and 85% raw absorbent meal. In other embodiments, other percentages of spontaneous combustion inhibitor are utilized.

OBJECTS OF THE INVENTION

Accordingly, a primary object of the present invention is to provide an absorbent meal made of almond hulls and shell for use in absorbing spilled materials and especially liquids.

Another object of the present invention is to provide a method for manufacture of absorbent meal from nut hulls and/or shell.

Another object of the present invention is to provide a method for applying absorbent meal which includes nut hull and/or shell therein to address a spill.

Another object of the present invention is to provide a beneficial use for remnants resulting from extraction of tree nut fruit from a hull and shell thereof.

Another object to the present invention is to provide an absorbent meal made of almond hull and/or shell which also is configured to resist spontaneous combustion.

Another object of the present invention is to optimize value of byproducts of tree nut fruit extraction.

Other further objects of the present invention will become apparent from a careful reading of the included drawing figures, the claims and detailed description of the invention.

DESCRIPTION OF THE PREFERRED EMBODIMENT

Figure 1:
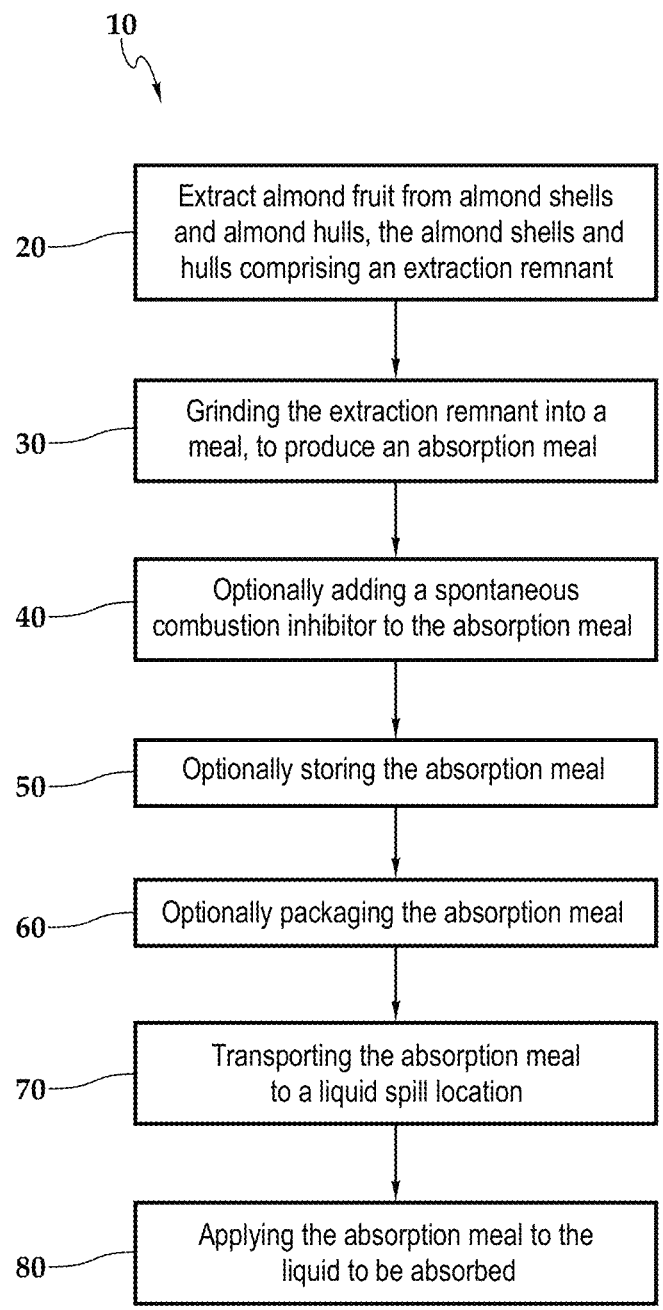
FIG. 1 is a flow chart illustrating the steps involved in the process of manufacturing and using absorbent meal according to one embodiment of this invention.

Referring to the drawings, wherein like reference numerals represent like parts throughout the various drawing figures, reference numeral 10 is directed to a process for making and using almond shells and hulls as an absorption meal, such as for absorbing a liquid spill. The process can be followed for manufacturing the absorption meal and/or the process can be followed for using the absorption meal in a cleanup operation. This invention is also directed to the absorption meal itself, according to various embodiments.

Figure 2:
FIG. 2 is a top plan view photo of a pile of raw absorption meal comprised of ground almond hull and shell, according to one embodiment of this invention. A dime is shown in the photo to provide scale.
Figure 2:

In essence, and with particular reference to FIGS. 1 and 2, basic details of the invention are disclosed according to a example embodiment. Absorption meal includes remnant of extraction of almond fruit. Such extraction remnant is comprised of almond hull and almond shell in one example embodiment. It is also conceivable that the extraction remnant could be pure hull or pure shell. This extraction remnant is typically ground into an absorption meal (also called a raw absorption meal). A spontaneous combustion inhibitor is optionally added to the absorption meal to make a finished absorption meal. Typically the absorption meal is stored until it is needed for use, such as in addressing a liquid spill. Absorption meal can optionally be packaged to keep the absorption meal's moisture content below maximum desirable levels, such as with packaging into a plastic outer envelope which is not water permeable. Absorbent meal is transported to a liquid spill location and then applied to the liquid to cause the liquid to be absorbed into the absorption meal.

More specifically, and with continued reference to FIG. 2, details of the absorption meal itself are described according to an example embodiment. In the first step 20 according to this example method 10, the almond fruit is extracted from almond shells and hulls. Almond shells and hulls comprise an extraction remnant.

Absorbent meal of this invention in a simplest embodiment is merely the extraction remnant, as shown in FIG. 2. Typically, this remnant is ground into a meal by grinding down particle sizes of the meal to no more than about 3 mm in size (although sizes smaller than about 5 mm is of some effectiveness). This size is one example size, and alternatively a meal with larger or smaller particle sizes could be utilized.

Ratios of hull to shell can vary in different embodiments. In one embodiment the absorbent meal has above at least about 15% shell. In other embodiments, the meal could have less than 15% shell and could be usable as an absorbent or as an animal feed. In one embodiment, the absorbent meal has a hull constituent (also called a first or primary constituent) and a shell constituent (also called a second or secondary constituent). The hull and shell constituent ratio can merely consist of the ratio of hull to shell at the remnant output of the fruit extraction equipment, without any alteration of this ratio.

In one embodiment, a separator acts upon the remnant output of the fruit extraction to produce two outputs, including an enhanced shell output and an enhanced hull output. The enhanced shell output comprise (or be further processed to comprise) the absorbent meal. The enhanced hull output could be a livestock feed.

In one embodiment, the absorbent meal is greater than 15% shell. In one embodiment, it is conceivable that the absorbent meal could be entirely shell or entirely hull or some other combination of hull and shell, and still usable, according to some aspects of this invention.

As an option, the absorbent meal can have a spontaneous combustion inhibitor added thereto. Examples of such spontaneous combustion inhibitors include sodium nitrate, sodium chloride, calcium carbonate, ammonium dihydrogen phosphate, calcium chloride, ammonium chloride, sodium acetate, and potassium chloride. In one embodiment, the spontaneous combustion inhibitor makes up about 15% of the finished absorbent meal.

The absorbent meal could be stored in open air or in warehouses, and is typically covered when in open air to keep the absorbent meal dry and to maximize its liquid absorbing characteristics (and resist mold growth or other decay/degradation thereof). As an option, the absorbent meal could be bagged into a plastic bag or other non-water permeable container or envelope. Absorbent meal could be transported in such containers and/or stored in such containers until ready to be used.

When a spill occurs of some liquid which is desired to be cleaned up (or otherwise have its negative consequences at least partially addressed), the absorption meal would be transported to a location where the spill has occurred. Absorbent meal would then be applied to the liquid, causing at least a portion of the liquid to be absorbed into the absorbent meal. Absorbent meal could then either remain in place or could be swept up and properly disposed of or otherwise beneficially used. One such beneficial use might be combustion within a power plant fueled primarily with biomass, such as cellulosic material or garbage. If the liquid being cleaned up is a hydrocarbon fuel, combustion would typically cause the fuel to merely decompose into steam and carbon dioxide, and thus be relatively superior to leaving such liquids in the environment long-term.

The absorbent meal can optionally be stored within a trailer, and the trailer can optionally include a dumping feature or a spreading feature to allow absorbent meal to be spread therefrom or dumped therefrom directly onto underlying pavement for contact with the liquid or other substance to be absorbed. The absorbent meal could be stored in such a trailer at various locations near where spills occur, such as along highways. When a spill occurs, such as after a collision where fuel tanks might rupture or contents of tanker trucks might leak, the trailer of absorbent meal can be quickly transported to the site of the spill and rapidly deployed to ameliorate negative consequences of the spill. Because the absorbent material is substantially an organic and renewable product, negative environmental consequences associated with utilizing many other absorbent materials are avoided.

This disclosure is provided to reveal a preferred embodiment of the invention and a best mode for practicing the invention. Having thus described the invention in this way, it should be apparent that various different modifications can be made to the preferred embodiment without departing from the scope and spirit of this disclosure. When embodiments are referred to as "exemplary" or "preferred" this term is meant to indicate one example of the invention, and does not exclude other possible embodiments. When structures are identified as a means to perform a function, the identification is intended to include all structures which can perform the function specified.

What is claimed is:

1. A method for addressing a liquid spill, including the steps of:
    transporting an absorbent meal to a liquid spill location, the absorbent meal comprising almond hull and almond shell components and a spontaneous combustion inhibitor selected from the group consisting of sodium nitrate, sodium chloride, ammonium dihydrogen phosphate, calcium chloride, ammonium chloride, sodium acetate, and potassium chloride; and
    applying the absorbent meal to the liquid spill to have at least a portion of the liquid absorbed into the absorbent meal.

2. The method of claim 1 wherein the almond shell comprises greater than about 15% of the absorbent meal.

3. The method of claim 1 wherein particle size for the absorbent meal is less than about 5 mm.

* * * * *